(12) United States Patent
Gupta et al.

(10) Patent No.: US 7,548,919 B2
(45) Date of Patent: Jun. 16, 2009

(54) COMPUTER PROGRAM PRODUCT FOR CONDUCTING A LOCK FREE READ

(75) Inventors: Monish Gupta, Santa Clara, CA (US); Scott David Lashley, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 194 days.

(21) Appl. No.: 11/534,564

(22) Filed: Sep. 22, 2006

(65) Prior Publication Data

US 2008/0077591 A1    Mar. 27, 2008

(51) Int. Cl.
*G06F 17/30* (2006.01)
(52) U.S. Cl. .............................. 707/8; 707/100; 707/200
(58) Field of Classification Search ........................ None
See application file for complete search history.

(56) References Cited

U.S. PATENT DOCUMENTS

| | | | | |
|---|---|---|---|---|
| 5,870,758 | A * | 2/1999 | Bamford et al. ............. | 707/201 |
| 5,950,210 | A | 9/1999 | Nelson ........................ | 707/203 |
| 6,304,924 | B1 | 10/2001 | Varma ......................... | 710/52 |
| 6,606,626 | B1 | 8/2003 | Ponnekanti ................... | 707/8 |
| 6,772,155 | B1 | 8/2004 | Stegelmann .................. | 707/8 |
| 6,957,236 | B1 | 10/2005 | Ganesh et al. .............. | 707/204 |
| 6,993,770 | B1 | 1/2006 | Detlefs et al. .............. | 719/315 |
| 2002/0059165 | A1 | 5/2002 | Hersh et al. ................ | 707/1 |
| 2004/0015642 | A1 | 1/2004 | Moir et al. .................. | 711/1 |
| 2005/0177831 | A1 | 8/2005 | Goodman et al. ........... | 718/100 |
| 2005/0216691 | A1 | 9/2005 | Michael ...................... | 711/170 |
| 2006/0037026 | A1 | 2/2006 | Doherty et al. ............. | 719/310 |

OTHER PUBLICATIONS

Sundell, H.; Tsigas, P.; *"Fast and Lock-Free Concurrent Priority Queues for Multi-Thread Systems"*.
Herlihy, M.; Moss, J.E.; *"Transaction Memory: Architectural Support for Lock-Free Data Structures"*.

* cited by examiner

*Primary Examiner*—Hung Q Pham
(74) *Attorney, Agent, or Firm*—Kunzler & McKenzie

(57) ABSTRACT

The present invention expounds upon the ANSI "read committed" isolation level by allowing readers to read committed data without waiting for a concurrent writer to the data to finish. The method returns a last committed version of the data as it existed prior to changes made by the concurrent writer. Only two versions of any data record are required to be stored in the record data store, the last committed version and the current version. The last committed version may be generated from an undo log record. Locating the appropriate undo log record may be accomplished by storing a log sequence number in a lock data structure associated with the requested data record. A transaction flag may also stored in the lock data structure to facilitate generating the last committed version. The method may also utilize one or more locks to detect a concurrent writer to the requested data.

7 Claims, 3 Drawing Sheets

COMPUTER PROGRAM PRODUCT FOR CONDUCTING A LOCK FREE READ

BACKGROUND OF THE INVENTION

1. Field of the Invention

This invention relates to data stores used for storing, retrieving, or updating records and more particularly relates to conducting a lock free read of those records.

2. Description of the Related Art

The use of data stores for data archive and manipulation is ubiquitous. It is conceivable that in the near future, the vast majority of businesses will rely on at least one form of a data store to bank their records. Because these data stores are relied on so heavily by businesses, the need for accurate and reliable reading of the records is essential. While the use of data stores is increasing, there are still problems associated with reading the vital records they store. Although the integrity of data stores has been progressed by applying ACID (Atomicity, Consistency, Isolation, and Durability) properties, these properties do not impose restrictions regarding read queries. As a result, several problems exist with read queries directed to a data store.

For example, under the lock based "read committed" isolation level, a request to read a record that is currently being written to may result in a deadlock. The "read committed" isolation level does not require a query to hold a lock on the record for the duration of its transaction. However, it is required to hold a lock on the record for a short duration or at least test the record for an available lock. As a result, multiple concurrent transactions executing under this isolation level may result in problems such as deadlocks.

"Repeatable read" is another isolation level that locks a record when it executes a transaction. This lock remains for the duration of the transaction. Because the lock is held for a longer period, a query to access the record may result in a timeout or even a deadlock.

Attempts have been made to remedy these consequences of data store access. One such remedy is a "snapshot" isolation level. The "snapshot" isolation level returns an image of the data store as it existed at a specific point in time. Because strict restrictions are not imposed on read requests, stale versions of the data store can be returned as an acceptable solution so long as all updates occur on the latest version. Multiple versions of the data store are typical retained with the "snapshot" isolation level; however, as more versions are stored, this remedy becomes more complex and is detrimental to system performance.

From the foregoing discussion, it should be apparent that a need exists for a method that conducts a lock free read. Beneficially, such a method would provide a simplistic solution to prevent deadlocks and timeouts when accessing data records and be less inhibiting on system performance than current solutions.

SUMMARY OF THE INVENTION

The present invention has been developed in response to the present state of the art, and in particular, in response to the problems and needs in the art that have not yet been fully solved by currently available methods for conducting lock free reads. Accordingly, the present invention has been developed to provide a method for conducting a lock free read that overcomes many or all of the above-discussed shortcomings in the art.

In one embodiment, the method for conducting a lock free read includes incorporating a last committed log sequence number and a transaction flag into currently used lock data structures. The last committed log sequence number points to an undo log record corresponding to a record's committed modification that would be necessary for generating a last committed version of the record.

The method facilitates safely modifying the record by using the lock data structure to gain an exclusive lock using a standard two-phase locking procedure. With this standard two-phase locking procedure, if a transaction wants to write an object, it must request an exclusive lock on the object. Additionally, a transaction may not request additional locks on an object once it releases a lock, and it may release locks at any time. Finally, the method facilitates returning the last committed version of the record when a read request occurs concurrently with a write request that has locked the record.

The method may also include pointing the log sequence number of the lock data structure to the undo log record from which the last committed version can be generated. Also, the transaction flag may be used to indicate whether the transaction owning the lock has inserted, updated, or deleted the record. The lock owned by the transaction can be held for the duration of the write transaction.

The undo log record pointed to by the log sequence number of the lock data structure can contain a complete "before" image of the record, or it might only contain delta information. If the undo log record contains delta information, the new, uncommitted version of the record is also used to generate the last committed version. Additionally, when only delta information is contained within the undo log record, additional log sequence number fields may be added to each undo log record involved in a transaction to link them when the transaction makes multiple updates to the same record or makes at least one update followed by deletion of the record. The aforementioned process is referred to as per-row backlinking.

In another embodiment, the method for conducting a lock free read includes storing information to generate a last committed version of a modified record and generating the last committed version of a modified record. Storing information occurs when the record has been distinctly modified. This information may be recalled and used to generate the last committed version of the record in response to a read request for a record that is currently being modified. One or more transaction flags may be maintained and used to indicate whether the modified record was inserted into, updated in, or deleted from a record data store. The transaction flag may be stored in various locations including the same location as the information to generate the last committed version of the modified record.

The presented methods effectively implement a modified form of the ANSI "read committed" isolation level, which modification allows for conducting lock free reads. The methods improve on the current "read committed" isolation level by returning the last committed version of a requested record. The last committed version may be created on an "as needed" basis, such as, when a read operation requests a row currently undergoing a write operation. Consequently, only two versions of a row need be stored at any given time, the last committed version and the current version. The method may be implemented on a per row basis so it does not need to revert the entire contents of the data store for every insert, update, or delete operation.

In summary, the present invention prevents deadlocks and increases reliability and performance by returning the last committed version of a row as needed and storing only two versions of a row at any given time. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
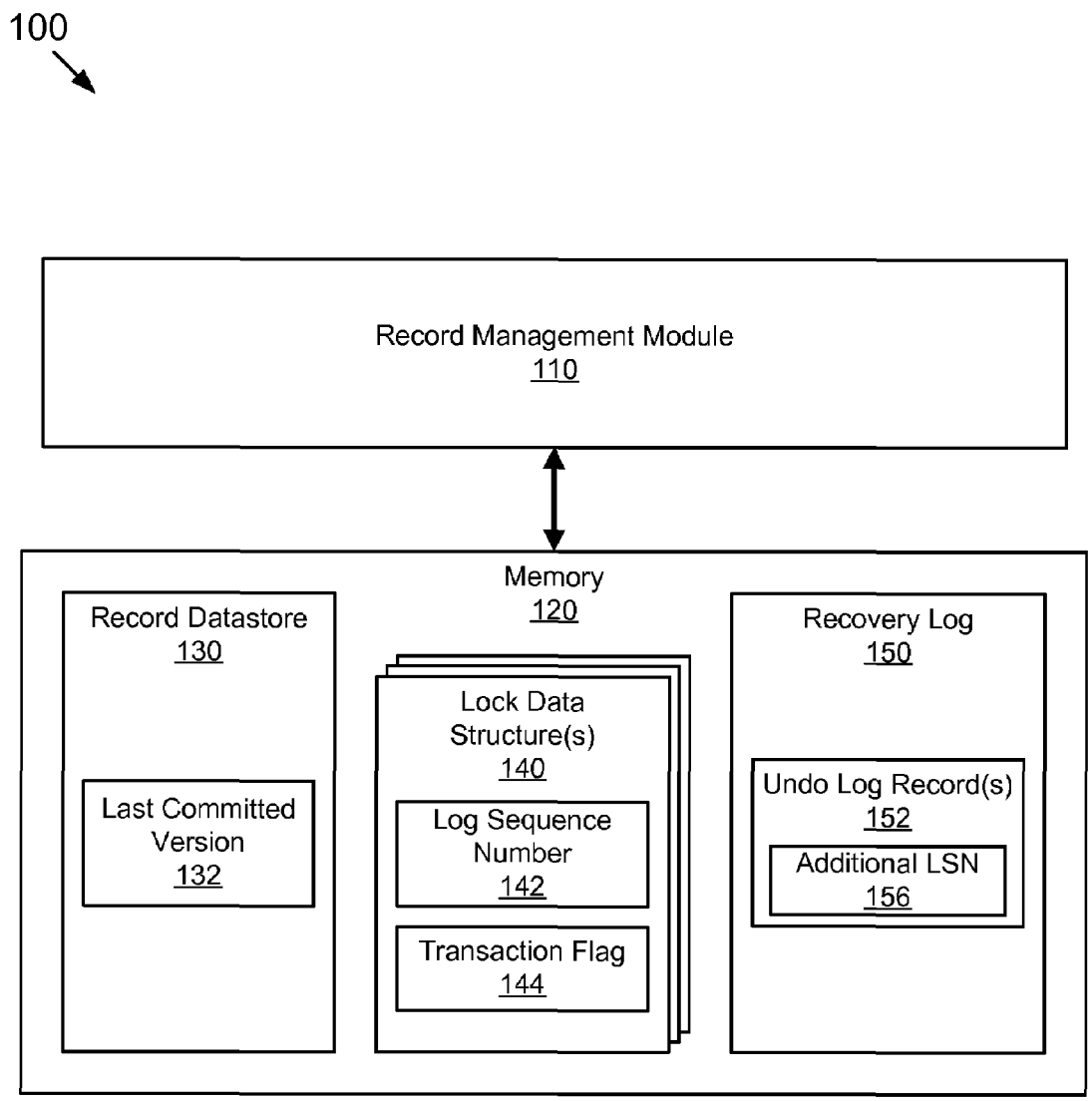
FIG. 1 is a schematic block diagram illustrating one embodiment of an environment for conducting a lock free read in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram of an environment for conducting a lock free read in accordance with the present invention. The depicted environment 100 includes a record management module 110, a memory 120, a record data store 130, a last committed version 132, a lock data structure 140, a log sequence number 142, a transaction flag 144, a recovery log 150, an undo log record 152, and an additional log sequence number 156. The operating environment 100 is one example of an operating environment suitable for conducting a lock free read in accordance with the present invention.

The record management module 110 may communicate with the record data store 130 to retrieve and archive data. In the depicted embodiment, the record management module 110 resides outside of memory 120. In certain embodiments, the record management module 110 resides in memory 120. In the depicted embodiment, memory 120 is non-volatile.

In the depicted embodiment, the record data store 130 stores the last committed version 132 of a data record. The record data store 130 may provide read or write access to records on a per record basis on demand. In one embodiment, the record data store 130 provides read or write access to a plurality of records on demand. The record management module 110 may communicate with the record data store 130 to retrieve and archive data records.

In the depicted embodiment, the last committed version 132 is stored in the record data store 130. The last committed version 132 may comprise an image of a data record at the record's last committed alteration. The last committed version 132 may be generated and returned when a read request for a record occurs concurrently with a write request that has a lock on the record. Returning the last committed version facilitates a lock-free read of the desired record. In one embodiment, the last committed version 132 is generated from information obtained from an undo log record 152. In certain embodiments, the last committed version 132 is generated and returned responsive to a read request of a record that is locked by a concurrent write request.

The lock data structure 140 may be comprised of elements to identify the type of lock as well as the lock's behavior. For example, the lock data structure may comprise a locking mode, lock granularity, and transaction identification. In one embodiment, the lock data structure 140 comprises a log sequence number 142 and a transaction flag 144.

The log sequence number 142 may be used to reference the undo log record 152 necessary for generating the last committed version 132. In one embodiment, the log sequence number 142 is appended to the lock data structure 140. The log sequence number 142 may be a designated field of the lock data structure 140. In certain embodiments, the log sequence number may be stored in a location suitable for facilitating on demand data retrieval such as the undo log record.

The transaction flag 144 may be used to identify the operation that the transaction owning the lock will impose on the data record. In certain embodiments, the transaction flag 144 is one or more bits appended to the lock data structure 140 to identify an insert, update, or delete operation. In one embodiment, the transaction flag 144 is represented as separate bits that indicate an insert, update, or delete operation. In certain embodiments, the transaction flag 144 may be stored in a location suitable for facilitating on demand data retrieval such as the undo log record.

The transaction flag 144 may be set according to the transaction owning the lock. For example, if the transaction is an insert operation, then the insert flag bit is set. In one embodiment, the transaction flag 144 is set according to the following: If the insert flag bit or delete flag bit is already set, then no further action is required. Else, if the transaction owning the lock is an insert operation, the insert flag bit is set. Otherwise, if the transaction owning the lock is an update or delete operation, then perform the applicable option from the following two choices. If the update flag is already set in the lock data structure 140, store the current log sequence number 142 along with the undo log record 152 being written. Otherwise, set the delete flag bit or update flag bit according to the operation and store the log sequence number 142 of the undo log record 152 in the lock data structure 140.

In one embodiment, the recovery log 150 comprises a plurality of undo log records 152 and may include other information to facilitate data recovery and durability such as log sequence numbers and redo log records. In the depicted embodiment, the undo log records 152 include one or more log sequence numbers that facilitate locating the pertinent record. The undo log records 150 comprise information required to generate the last committed version 132.

An undo log record 152 may store information required to undo all in progress transactions of a record. In one embodiment, the undo log record 152 stores alterations of one transaction sequence performed on one record or on a plurality of records. In certain embodiments, the undo log record 152 stores alterations of a plurality of transaction sequences performed on one record or on a plurality of records. The undo log record 152 comprises a log sequence number for locating and identifying the undo log record 152. In the depicted embodiment, the undo log record 152 contains delta information for a requested record. In this embodiment, the undo log record 152 receives an additional log sequence number 156 when a transaction either makes multiple updates to the record or makes at least one update to the record followed by deleting the record. The additional log sequence number 156 links a plurality of undo log records 152 corresponding to a transaction that either makes multiple updates to the same record or makes at least one update to the record followed by deleting the record; the preceding is further referred to as per-row back-linking.

The last committed version 132 may be generated and returned when a read request is received that conflicts with a concurrent write request holding a lock on the desired record. In such a situation, if the insert flag bit of the lock data structure 140 is set, the record is unavailable to the reader because the record was not committed at the time of the read request, and therefore did not exist at the time of the read request; as a result, no last committed version 132 needs to be generated. If the delete flag bit of the lock data structure 140 is set, the log sequence number of the undo log record 152 generated from the locking, delete transaction is copied; the undo log record 152 is read; and the value associated with the locking, delete transaction from the undo log record 152 is copied into the local buffer.

Further, if the update flag bit is set along with the delete flag bit, applicable undo log records 152 are linked, via per-row back-linking, to facilitate reading of all undo log records 152 generated from the update transaction. Next, the undo operations from the linked undo log records 152 are applied on the value stored in the local buffer.

Finally, if only the update flag bit is set, then the current version of the record is read into the local buffer, the log sequence number from the undo log record 152 generated from the locking transaction is copied, and all undo operations from each undo log record 152 linked via per-row back-linking are applied on the record stored in the local buffer.

In certain embodiments, the undo log record 152 comprises a complete "before" image of a requested record. When a complete "before" image of a requested record is provided by the undo log record 152, generating and returning the last committed version 132 in response to a read request of a locked record may be further optimized by allowing only the first update in a transaction sequence to update the log sequence number 142; subsequent updates in the transaction do not affect the log sequence number 142.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
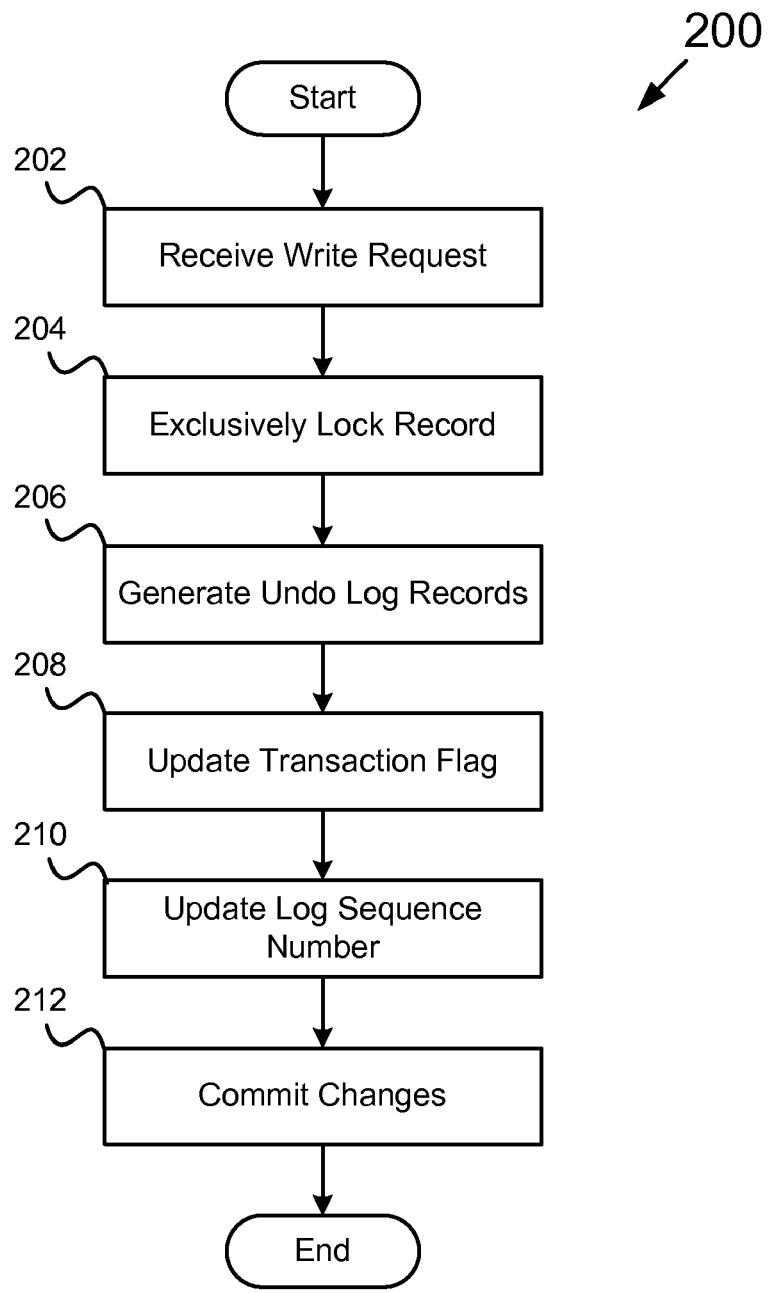
FIG. 2 is a schematic flow chart diagram illustrating one embodiment of a method for updating the log sequence number and transaction flag in preparation for conducting a lock free read in accordance with the present invention.

FIG. 2 depicts one sequence 200 for updating the log sequence number and transaction flag in preparation for conducting a lock free read in accordance with the present invention. The sequence 200 includes receiving 202 a write request, exclusively locking 204 a record, generating 206 undo log records 152, updating 208 a transaction flag 144, updating 210 log sequence number 142, and committing 212 changes. The sequence 200 teaches updating the log sequence number 142 and transaction flag 144 in preparation for conducting a lock free read in accordance with the present invention.

Receiving 202 a write request includes receiving a transaction request to insert, update, or delete a record in the record data store 130. Exclusively locking 204 a record is part of the two-phase locking process. The write request may establish an exclusive lock on the data record in order to complete the transaction. Exclusively locking 204 a record may last for the duration of the transaction.

Generating 206 undo log records 152 may be responsive to a write transaction. When a data record is altered via an insert, update, or delete operation, undo log records 152 are generated in the recovery log to facilitate withstanding data loss and promote durability of the record data store 130. Generating 206 undo log records 152 includes assigning a log sequence number 142 as an identifier to each log record to facilitate prompt retrieval. Generating 206 undo log records 152 may include providing either delta or complete undo information within the record. In one embodiment, undo log records 152 that comprise delta information may receive an additional log sequence number 156 to link all undo log records 152 generated when a transaction makes multiple updates to the same record or makes at least one update to the record followed by deleting the record, per-row back-linking.

Updating 208 the transaction flag 144, in one embodiment, involves updating an insert flag bit, an update flag bit, or a delete flag bit respective of the transaction received. In addition, updating 208 the transaction flag 144 may occur according to the following: If the insert flag bit or delete flag bit is already set, do not alter the transaction flag 144. Else, if the transaction owning the lock is an insert operation, the insert flag bit is set; else, if the transaction owning the lock is an update or delete operation, the applicable following option is performed: If the update flag bit is already set, the current log sequence number value is stored into the undo log record 152 being written. Otherwise, the delete flag bit or update flag bit is set respective of the operation and store the log sequence number 142 of the undo log record 152 in the lock data structure 140.

In the depicted embodiment, updating 208 the transaction flag 144 initially includes modifying the lock data structure to include one or more transaction flag bits. If the lock data structure already comprises the flag bits, then the method may modify them accordingly. In certain embodiments, updating 208 the transaction flag 144 includes maintaining the transaction flag 144 in a desirable location. Such location may include the undo log record 152, the record management module 110, or other location able to facilitate on demand retrieval of information.

Updating 210 the log sequence number 142 may include appending the log sequence number 142 of an undo log record 152 onto the lock data structure. In certain embodiments, updating 210 the log sequence number 142 may include adjusting a field of the lock data structure. In certain embodiments, updating 210 the log sequence number 142 includes maintaining the log sequence number 142 in a desirable location. Such a location may include the undo log record 152, the record management module 110, or other location able to facilitate on demand retrieval of information. Committing 212 the changes may include the transaction terminating, the operation completing, and applying the write alterations performed during the transaction. The exclusive lock on the record may be released. After committing 212 the changes, the record data store becomes the most recent version of the record.

Figure 3:
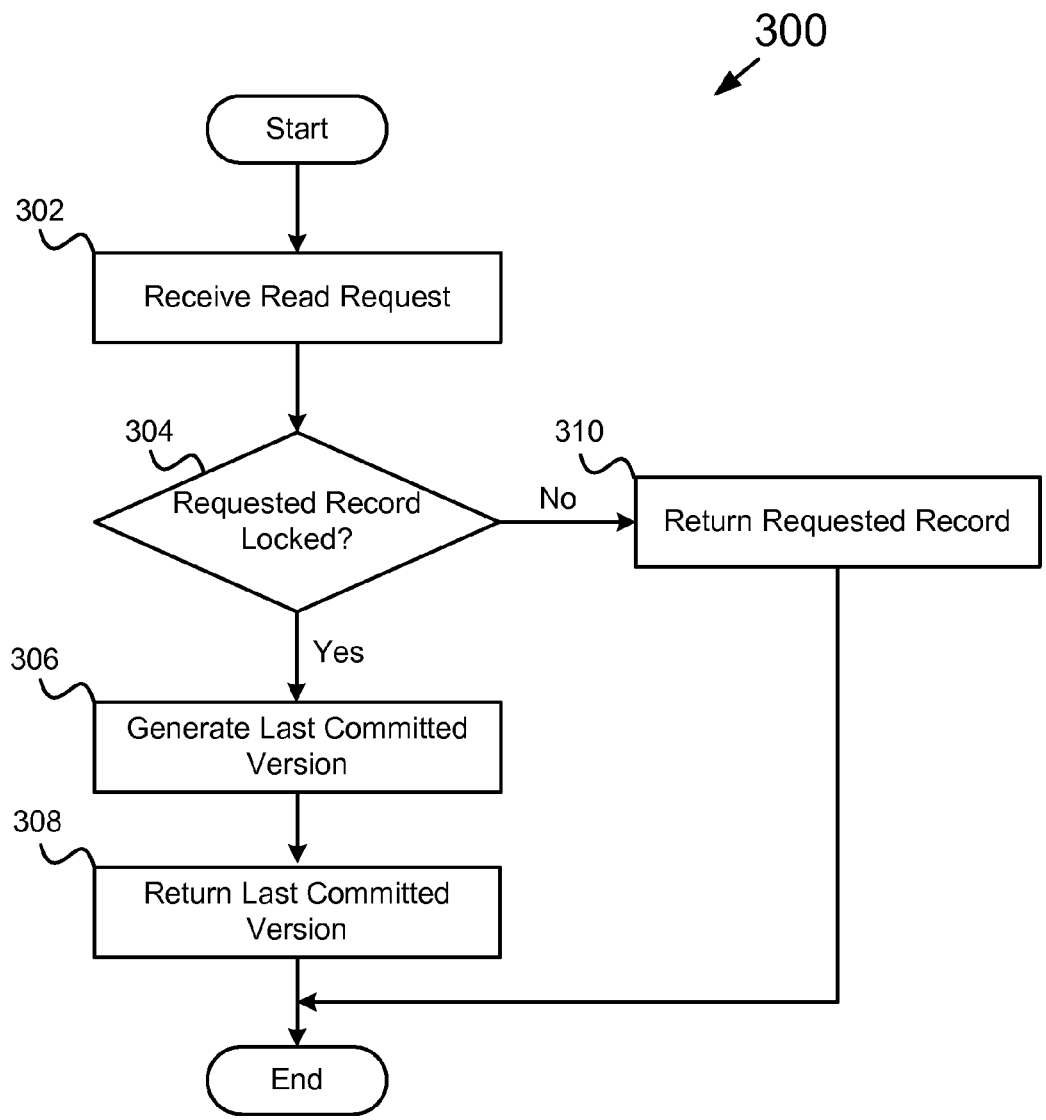
FIG. 3 is a schematic flow chart diagram illustrating one embodiment of a method for conducting a lock free read in accordance with the present invention.

FIG. 3 depicts one sequence for conducting a lock free read in accordance with the present invention. The sequence 300 includes receiving 302 a read request, deciding 304 whether the requested record is locked, generating 306 a last committed version, returning 308 a last committed version, and returning 310 the requested record. The sequence 300 teaches conducting a lock free read in accordance with the present invention.

Receiving 302 a read request includes receiving a transaction request to read a record in the record data store 130. The desired record may be held by an exclusive lock. Deciding 304 whether the record is locked may be determined by identifying if there is a concurrent write transaction accessing the record. This may be accomplished by sending a request to the record and waiting for an acknowledgment or by checking a transaction flag associated with the record.

The log sequence number 142 identifies the undo log record 152 needed for generating 306 the last committed version 132. Generating 306 the last committed version 132 includes accessing the log sequence number 142 from the lock data structure 140 to identify the necessary undo log record 152. The undo log record 152 acquired for generating 306 the last committed version 132 may contain a complete "before" image of the record being written to. In certain embodiments, the undo log record 152 contains only an incomplete "before" image, delta information, for the record.

When the undo log record 152 contains a complete "before" image of the record, all necessary information regarding the desired record is contained within the undo log record 152. When the undo log record 152 contains only delta information for the record, the undo log record's information is applied to the new, uncommitted version of the record to generate the last committed version 132.

Generating 306 the last committed version 132 comprises the following: if the insert flag bit of the lock data structure is set, the record is unavailable to the reader because the record was not committed at the time of the read request, and therefore did not exist at the time of the read request; as a result, no last committed version 132 needs to be generated. If the delete flag bit of the lock data structure is set, the log sequence number 142 of the undo log record 152 generated from the locking, delete transaction is copied; the undo log record 152 is read; and the value associated with the locking, delete transaction from the undo log record 152 is copied into the local buffer.

Further, if the update flag bit is set along with the delete flag bit, applicable undo log records 152 are linked, via per-row back-linking, to facilitate reading of all undo log records 152 generated from the update transaction. Next, the undo operations from the linked undo log records 152 are applied on the value stored in the local buffer.

Finally, if only the update flag bit is set, then the current version of the record is read into the local buffer, the log sequence number 142 from the undo log record 152 generated from the locking transaction is copied, and all undo operations from each undo log record 152 linked via per-row back-linking are applied onto the record stored in the local buffer.

In certain embodiments, the undo log record 152 comprises a complete "before" image of a requested record. When a complete "before" image of a requested record is provided by the undo log record, generating and returning the last committed version in response to a read request of a locked record may be further optimized by allowing only the first update in a transaction sequence to update the log sequence number 142; subsequent updates in the transaction do not affect the log sequence number 142.

Returning 308 the last committed version 132 occurs when a read operation requests a record that is locked. The step of generating 306 the last committed version 132 copied the last committed version 132 for the desired record in the local buffer. The last committed version 132 is then moved from the local buffer to the source requesting the record.

Returning 310 the requested record occurs when the requested record is not held by a lock. A request to read the record is granted a temporary lock on the record. The record is accessed and returned. And the temporary lock is released.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed and executed by a processor for conducting a lock free read, the operations of the computer program product comprising:
    receiving a write transaction request on a record, the received write transaction request comprising at least a first operation on the record and a second operation on the record;
    conducting a two-phase exclusive-lock locking procedure for the received write transaction request on the record using a lock data structure, wherein the lock data structure includes a last committed log sequence number and a transaction flag for the record, the transaction flag indicating whether the transaction corresponding to the last committed log sequence number is an insert operation, an update operation, or a delete operation, and wherein the last committed log sequence number points to data corresponding to a last committed version of the record;
    performing the first operation of the transaction on the record, and committing a corresponding change to the record;
    updating the last committed log sequence number and the transaction flag, wherein the updated last committed log sequence number points to the committed corresponding change to the record and the updated transaction flag indicates whether the performed first operation is an insert operation, an update operation, or a delete operation;
    receiving a read transaction request for the record;
    generating an updated last committed version of the record based on the updated last committed log sequence number and the updated transaction flag in response to receiving the read transaction request, the updated last committed version of the record that is generated comprising the committed corresponding change to the record;
    returning the updated last committed version of the record that is generated in response to the read transaction request, and
    performing the second operation on the record and releasing the two-phase exclusive-lock locking procedure.

2. The computer program product of claim 1, wherein the last committed log sequence number points to data within a log record, the last committed version generated from the data within the log record.

3. The computer program product of claim 1, wherein the data corresponding to the last committed version of the record comprises delta information for the record.

4. The computer program product of claim 3, wherein the operations further comprise appending an additional log sequence number field onto an undo log record to link to corresponding undo log records.

5. The computer program product of claim 1, wherein the data corresponding to the last committed version of the record comprises complete information for the record.

6. The computer program product of claim 1, wherein the operations further comprise setting the transaction flag to indicate an update transaction in response to a first update of a record within a transaction sequence.

7. A computer program product comprising a computer readable storage medium having computer usable program code programmed and executed by a processor for conducting a lock free read, the operations of the computer program product comprising:
    receiving a write transaction request on a record, the received write transaction request comprising at least a first operation on the record and a second operation on the record;
    conducting a two-phase exclusive-lock locking procedure for the received write transaction request on the record using a lock data structure, wherein the lock data structure includes a last committed log sequence number and a transaction flag for the record, the transaction flag indicating whether the transaction corresponding to the last committed log sequence number is an insert operation, an update operation, or a delete operations, and wherein the last committed log sequence number points to data corresponding to a last committed version of the record;
    performing the first operation of the transaction on the record, and committing a corresponding change to the record;
    updating the last committed log sequence number and the transaction flag, wherein the updated last committed log sequence number points to the committed corresponding change to the record and the updated transaction flag indicates whether the performed first operation is an insert operation, an update operation, or a delete operation;
    receiving a read transaction request for the record;
    generating an updated last committed version of the record based on the updated last committed log sequence number and the updated transaction flag in response to receiving the read transaction request, the updated last committed version of the record that is generated comprising the committed corresponding change to the record in response to the updated transaction flag indicating an update transaction or a delete transaction;
    returning the updated last committed version of the record that is generated in response to the read transaction request; and
    performing the second operation on the record and releasing the two-phase exclusive-lock locking procedure.

* * * * *